United States Patent [19]
Massart
[11] 4,329,241
[45] May 11, 1982

[54] MAGNETIC FLUIDS AND PROCESS FOR OBTAINING THEM

[75] Inventor: René Massart, Cesson, France
[73] Assignee: Agence Nationale de Valorisation de la Recherche (ANVAR), Paris, France

[21] Appl. No.: 168,256
[22] Filed: Jul. 10, 1980
[30] Foreign Application Priority Data
Jul. 20, 1979 [FR] France ............ 79 18842
[51] Int. Cl.[3] ............ G01N 27/82; H01F 1/00
[52] U.S. Cl. ............ 252/62.52
[58] Field of Search ............ 252/62.51 R, 62.52

[56] References Cited

U.S. PATENT DOCUMENTS

| | | | |
|---|---|---|---|
| 3,990,981 | 11/1976 | Kovac et al. | 252/62.54 |
| 4,019,994 | 4/1977 | Kelley | 252/62.52 |
| 4,094,804 | 6/1978 | Shimoiizaka | 252/62.52 |

OTHER PUBLICATIONS

Ronay, IBM Tech. Disclosure Bull. vol. 19, No. 7, pp. 2753-2758 (12/76).

*Primary Examiner*—F. Edmundson
*Attorney, Agent, or Firm*—Hammond & Littell, Weissenberger and Muserlian

[57] ABSTRACT

New ferrofluids.

They consist essentially of an aqueous sol of polyoxyanions of Fe(III) and at least one metal of oxidation degree II from the first series of transition metals, with an associated cation, notably selected from $H^+$, $N(CH_3)_4^+$ and $N(C_2H_5)_4^+$.

Application for example for obtaining levitation or self-sustentation systems, as well as for forming contactors or rotating paths.

11 Claims, No Drawings

MAGNETIC FLUIDS AND PROCESS FOR OBTAINING THEM

This invention relates to new magnetic fluids, and to a process for obtaining same. More precisely, the invention relates to new ferrofluids and a process for preparing them.

Ferrofluids are usually defined as being stable colloidal suspensions of ferromagnetic or ferrimagnetic solids. In other words, they are newtonian colloidal suspensions, perfectly stable and fluid in a magnetic field of ferromagnetic or ferrimagnetic subdomains, and therefore they should not be confused with the fluids used in magnetic clutches, which flocculate and lose their fluid character as soon as they are subjected to a magnetic field.

Another type of magnetic fluids is also known, these are paramagnetic aqueous solutions; these solutions contain paramagnetic ions, that is to say, ions with an electronic structure containing unpaired electrons and whose paramagnetism is easily calculated from the quantic numbers characterizing these ions.

However, a magnetic field exerts on a ferrofluid a force approximately twice as great as that the same field exerts on such a paramagnetic solution.

Therefore, ferrofluids have been found to be particularly advantageous as they make it possible to obtain high expulsive forces with a weak magnetic field and, hence, a moderate consumption of energy, to the extent that, for some applications, permanent magnets are sufficient.

The first ferrofluids were made in the laboratories of the NASA round about 1963 (see U.S. Pat. No. 3,215,572) by grinding ferrite for several weeks in the presence of kerosene or oleic acid. But grinding must be continued for a very long time for the solid particles to be small enough (in practice in the range of $100\times10^{-10}$ m) to permit stabilization of the suspension by brownian movement. This corresponds to particles each of which consists of a magnetic subdomain and of only about $10^5$ atoms. It is the oleic acid which, being adsorbed on the surface of the particles in an organic medium, in particular in kerosene, provides repulsive forces as far as at some tens of Angströms and thus prevents magnetic flocculation.

Such a process is obviously very expensive.

A decisive step for reducing this cost was taken in 1975 by Khalafalla S. E. (see Magnetic Fluids, Chemical Technology Vol. 5 September 1975, pages 540-546, which is incorporated herein by reference) who proposed forming particles of colloidal magnetite by germination and development starting with Fe(II) and Fe(III) (in practice, ferrous chloride and ferric chloride), under suitable conditions of stirring and supersaturation to limit the size of the crystals formed. (See also IBM Technical Disclosure Bulletin, Vol. 19 No. 7, December 1976, pages 2753-2759, which is incorporated herein by reference). The reaction is then conducted in the presence of ammonia, kerosene and oleic acid. The principle of the method was, moreover, previously known by physicians specialized in magnetism under the name of the Elmore method.

In another connection, in France, Papirer E. elaborated a preparation of ferrofluids containing metallic cobalt in suspension in toluene (see "Préparation de suspensions de particules de cobalt finement divisées", C. R. Acad. Sc. Paris, t.285 (July 18, 1977)- Series C, 77-76).

However, these procedures had the common drawback of necessitating expensive and polluting organic solvents, and/or at least requiring the incorporation of at least one surfactant which may also be a polluting element and which increases the cost of the preparations containing it.

It has now unexpectedly been found that it is possible to obtain ferrofluids without the addition of a surfactant and in water, and it has also been found that the range of ferrofluids which may be prepared in this way is not limited to the case of iron [Fe(III)/Fe(II)] and can comprise other metals to replace Fe(II).

The first object of the invention is new ferrofluids, essentially consisting of an aqueous solution or sol of polyoxoanions of Fe(III) and at least one metal at the oxidation degree II, selected from metals of the first series of transition metals, and notably from Fe(II), Co(II), Mn(II), Cu(II) and Ni(II), with an associated cation. As metal M(II) with oxidation degree II, Fe(II), Co(II) and Cu(II) are especially preferred.

The solubility of the ferrofluid in water depends on the pH, the metal (or metals) M(II) present, the ratio Fe(III)/M(II), and the nature of the cation associated with the polyoxoanion.

The associated cation may be selected from $H^+$,$N(CH_3)_4{}^+$$N(C_2H_5)_4{}^+$ and the like, so long as they render the polyoxoanion more soluble in water than the $Na^+$, $K^+$ and $NH_4{}^+$ cations, for example. However it should be noted that, when the associated cation is $H^+$ (i.e. in acidic medium), the polyoxoanion can be regarded, when taken together with the associated cation, as a polycation, and the stability of the solutions also depends on the anions which are in the solution; for example, anions such as $NO_3{}^-$, $Cl^-$, $ClO_4{}^-$ lead to a good stability, whereas $SO_4{}^{--}$ precipitates practically quantitatively the polycation.

In each particular case it is possible, using routine trials, for those with an ordinary skill in the art to determine the most suitable pH and the most fitting associated cation.

The new ferrofluids of the invention can be identified by their physical-chemical characteristics as follows:

- as stated hereinabove, they consist essentially of an aqueous solution of polyoxoanions of Fe(III) and at least one metal M(II) selected from the first series of transition metals, with an associated cation.
- the polyoxoanions form grains with a mean diameter in the order of hundred angströms and having a molecular weight in the order of $10^6$ to $10^7$.
- their absorption spectrum in the visible light has a shoulder between about 450 and 500 nm and a maximum absorption at 1400 nm, for Fe(III)/-Fe(II), in the near IR.
- if necessary, they can be completely dehydrated and resolubilized without difficulty. For example, at 100° C., dehydration provides a solid comprising one mole water per mole total iron (including, therefore, Fe(II) in the case of Fe(III)/Fe(II)). This solid can be directly resolubilized in water.
- the X-ray powder diagram is identical to that of bivalent metal ferrites. In the case of ferrofluid Fe-(III)/Fe(II) in particular, even when the iron is completely oxidized, the diagram is not that of $\gamma Fe_2O_3$, but remains that of magnetite. Measurement of the width of the lines confirms a size of about 100 angströms for the polyoxoanions.

A second object of the invention is a process for obtaining such ferrofluids, in an aqueous medium and without the addition of a surfactant to prepare them, which process comprises adding to a base of a suitable amount of the product of dissolution in water of the salts of the appropriate metals to form a gel; after optional separation of said gel, effecting a cation exchange by means of an aqueous solution of a suitable cation; and separating the gel so obtained, which is resolubilized to an aqueous solution with, optionally, adjustment of the pH by a base.

In practice, the amount of base to which there is added the dissolution product in water of the metal salts in question is an excess, based on the stoichiometric amount necessary for the formation of hydroxides of the metals present. Depending on the metal M(II) used, heating may be advisable to promote dissolution in the base.

According to another embodiment of this process, it is possible to dispense with gel separation by using a base with a cation suited to form the aforesaid associated cation.

Generally speaking, the sources of the starting metals are salts which can be selected, notably, from:

- for Fe(III): ferric alum, ferric chloride and ferric nitrate;
- for M(II): Mohr's salt, ferrous chloride, ferrous sulphate and the hydrosoluble salts of metals of oxidation degree II of the first series of transition metals.

Although, in the preparation, the ratio of Fe(III) to the bivalent metal M(II) (whether there be one or more than one of the latter) in the ferrofluid is not critical, a ferrofluid having an initial ratio Fe(III)/M(II) of about 2 is preferable.

It should also be noted that the ratio Fe(III)/M(II) is susceptible to change with time, by the simple fact of oxidation in air, particularly in the case of a ferrofluid of the type Fe(III/Fe(II). But this is not prejudicial to the qualities of the final product in question.

The strong base initially added to these salts may be any suitable base, and notably NaOH, or again, tetramethyl- or tetraethylammonium hydroxide.

In the particular case of Fe(III)/Fe(II) ferrofluids, it is also possible at this stage to use $NH_3$ in aqueous solution. The compound used to provide the associated cation can be selected from suitable acids, notably HCl, $HNO_3$ or $CH_3COOH$, or from tetramethyl- or tetraethylammonium hydroxide.

In each of the steps where a gel is to be collected or recovered, the operation is conducted in the conventional manner, i.e. by decantation on a magnet or by centrifugation, after optional washing with water.

From the magnetic standpoint, the ferrofluids of the invention have characteristics similar to those of ferrofluids hitherto known.

They are, therefore, suited for use in all the applications envisaged for these compounds, bearing in mind that, in the presence of a magnetic field, they constitute an anisotropicmedium for which the direction of the field is a preferential direction. These applications are, among others, levitation, self-sustentation or preparation of contactors or rotating paths.

The invention will be described more specifically in the following examples, which in no way limit it.

EXAMPLE 1

This example relates to the preparation, according to the invention, of Fe(II)/Fe(II) ferrofluids starting with an initial Fe(III)/Fe(II) ratio of 2.

(a) 400 ml of 0.75 M soda solution was poured into a 2 l beaker and was heated to 100° C. This solution was maintained at 100° C. and was stirred vigorously with a heating magnetic agitator, while a solution formed by mixing 40 ml 1 M $FeCl_3$ + 10 ml 2 M $FeCl_2$, 2 M HCl was added, drop by drop (for 5 minutes) from a separating funnel.

(b) The mixture was maintained at about 100° C. for 10 minutes and then left to cool to ambient temperature.

(c) The gel formed was decanted onto a permanent magnet and the supernatent solution was removed with a pipette attached to a water jet aspirator, (d) The gel recovered in (c) was agitated with 200 ml 1 M nitric acid, for 10 minutes on a magnetic agitator. Step (c) was then repeated.

(e) Step (d) was repeated twice.

(f) The gel was stirred with 200 ml water for 5 minutes. 200 ml 1 M nitric acid was added and step (c) was repeated.

(g) Step (f) was repeated three times.

(h) The gel was centrifuged at 2000 r.p.m. for 1 hour and the supernatent was removed.

(i) 3 g of this gel were dissolved in water and brought up to a final volume of 10 ml. Determination of total iron and Fe(II) by potassium bichromate in the presence of diphenylamine sulphonate (according to Charlot, Les Méthodes de Chimie Analytique; Masson, 1966) demonstrated a total iron concentration of 1.36 M and a ratio Fe(III)/Fe(II) = 15.

EXAMPLE 2

The procedure according to example 1 was followed except that, instead of step (i), 3 g of the gel of step (h) were dissolved in an aqueous solution of 0.5 M tetramethylammonium hydroxide. Analysis determined the ratio Fe(III)/Fe(II) to be 11.

EXAMPLE 3

This example illustrates the preparation, according to the invention, of Fe(III)/Fe(II) ferrofluids from an initial ratio Fe(III)/Fe(II) = 5.

The process was conducted as in steps (a) to (h) of the process according to example 1, except that 4 ml 2 M $FeCl_2$, 2 M HCl were used instead of 10 ml in step (a).

The gel obtained in (h) was water soluble and analysis of a solution with a total iron content of 0.68 M demonstrated a ratio Fe(III)/Fe(II) of 20.

EXAMPLE 4

40 ml of 1 M $FeCl_3$ and 10 ml 2 M $FeCl_2$ were mixed with 200 ml water. The mixture was stirred vigorously at ambient temperature and 120 ml of 2 M ammonia was rapidly added. Stirring was continued for 5 minutes.

Then step (c) and the following steps (up to step i) of the process of the invention were followed.

An aqueous ferrofluid was obtained, which was subjected to the following assessments:

- the mean charge was determined by means of the analytic method of step (i) according to example 1; the ratio obtained in the Fe(III)/Fe(II) solution was 10. Protometric assessment of this solution by tetramethylammonium revealed a ratio $H_3O^+$/total iron of 0.07.

the molar mass was determined by means of measurement of the apparent sedimentation coefficient by analyatic ultracentrafugation at 8000 r.p.m. Exploitation of the results, taking as a model a spherical particle, demonstrated a molar mass in the order of $8.10^6$.

the absorption spectra were established in the visible; these spectra, conducted from 350 nm, showed a shoulder between 450 and 500 nm. Furthermore, a maximum absorption at 1400 nm was revealed in the region close to IR.

EXAMPLE 5

40 ml 1 M tetramethylammonium hydroxide were poured onto the mixture of 10 ml 1 M $FeCl_3$ and 4 ml 0.5 M $FeSO_4$, 1 N $H_2SO_4$. The whole was heated until dissolution and the desired ferrofluid was obtained directly.

EXAMPLE 6

This example relates to the preparation according to the invention of Fe(III)/Co(II) ferrofluids, from an initial ratio iron/cobalt=2.

The process was conducted as in (a) to (h) in example 1, but using 80 ml 0.5 M $FeCl_3$ and 40 ml 0.5 M $Co(NO_3)_2$. Determination of cobalt by cerium (IV) in the presence of orthophenanthroline (according to Charlot, Les Méthodes de Chimie Analytique; Masson, 1966) in a solution obtained by dissolution of the gel in water, revealed a ratio Fe/Co of 1.88. Protometric determination of this same solution with tetramethylammonium enabled the ratio $H_3O^+$/total iron to be assessed as 0.33.

Furthermore, exploitation of a magnetization curbe obtained with this iron-cobalt ferrofluid of a concentration of 0.6 M Fe(III), in an aqueous solution with 0.3 M tetramethylammonium hydroxide enabled the following characteristics to be established:

particle diameter: 121 angströms standard deviation of size distribution (assumed to be gaussian): 71 angströms magnetization to saturation of the fluid (1 gauss$=1\times10^{-4}$ teslas): 66 gauss/cm3

EXAMPLE 7

This example illustrates the preparation, according to the invention, of Fe(III)/Co(II) ferrofluids from an initial ratio iron/cobalt=5.

A similar procedure was followed as in example 1 (steps (a) to (c)), but using 100 ml 0.5 M $FeCl_3$ and 20 ml 0.5 M Co $(NO_3)_2$. The gel formed and recovered at the end of step (c) was stirred for 10 minutes with 200 ml 4 M acetic acid. Step (c) and subsequently step (h) were repeated. The gel obtained was stirred for 10 minutes with 50 ml 1 M nitric acid.

Step (c) followed by step (h) were again repeated.

Determination of the solution obtained by dissolution in water of the gel recovered showed a ratio iron/cobalt of 4.63 for a concentration (iron)=0.2 M.

EXAMPLE 8

This example illustrates the preparation, according to the invention, of Fe(III)/Co(II) ferrofluids from an initial ratio iron/cobalt=1.

A similar procedure was followed as in example 1 (steps (a) to (c)) using, this time, 60 ml 0.5 M $FeCl_3$ and 60 ml 0.5 M $Co(NO_3)_2$. The gel was recovered and stirred with 200 ml 4 M acetic acid for 10 minutes. Step (c) followed by step (h) were then effected.

Determination of the solution obtained:

(1) by dissolution of the gel in water, revealed a ratio iron/cobalt of 1.35 for (iron): 0.34 M;

(2) by dissolution of the gel in a 1 M tetramethylammonium hydroxide, revealed a ratio iron/cobalt of 1.32 for (iron)=0.6 M.

What I claim is:

1. Ferrofluids consisting essentially of an aqueous solution free of surfactants of polyoxoanions of Fe(III) and at least one metal with an oxidation degree II selected from transition metals consisting of iron, cobalt, manganese, copper and nickel, with an associated cation selected from $H^+$, $N(CH_3)^+{}_4$ and $N(C_2H_5)^+{}_4$.

2. Ferrofluids according to claim 1, wherein the polyoxoanions form particles having a mean diameter in the order of a hundred angströms and a molecular weight in the order of $10^6$ to $10^7$.

3. Ferrofluids according to claim 1 which has an absorption spectrum in the visible light showing a shoulder in the range of about 450 to 500 nm.

4. Ferrofluids according to claim 1, which comprise Fe(III)/Fe(II) polyoxoanions and have a maximum absorption at 1400 nm in the near IR.

5. Ferrofluids according to claim 1, which are dehydrated.

6. Ferrofluids according to claim 1, which have an X-ray powder diagram identical to that of bivalent metal ferrites.

7. A process for producing ferrofluids according to claim 1, which comprises adding to a base selected from NaOH, $NH_3$ in aqueous solution, tetramethyl ammonium hydroxide and tetraethyl ammonium hydroxide a suitable amount of the product of dissolution in water of the salts of the appropriate metals to form a gel; after optional separation of this gel, effecting on said gel a cation exchange by means of an aqueous solution of a suitable cation provided by means of a compound selected from HCl, $HNO_3$, $CH_3COOH$, tetramethyl ammonium hydroxide and d tetraethyl ammonium; and separating the gel so obtained, which is resolubilized to an aqueous solution with, optionally, adjustment of the pH by a base.

8. A process according to claim 7, wherein amount of the base to which there is added the product of dissolution in water of the metal salts shows an excess based on the stoichiometric amount necessary for the formation of hydroxides of the metals presents.

9. A process according to claim 7, wherein separation of the gel is dispensed with by using a base the cation of which is suited to constitute the associated cation.

10. A process according to claim 7, which comprises using, as sources of starting metals:

for Fe(III): ferric alum, ferric chloride or ferric nitrate;

for M(II): Mohr's salt, ferrous chloride, ferrous sulphate or a hydrosoluble salt of at least one metal of oxidation degree II of said transition metals.

11. Ferrofluids consisting essentially of an aqueous sol free of surfactants of polyoxoanions of Fe(III) and at least one metal with an oxidation degree II selected from transition metals consisting of iron, cobalt, manganese, copper and nickel, with an associated cation selected from $H^+$, $N(CH_3)^+{}_4$ and $N(C_2H_5)^+{}_4$, wherein said polyoxoanion particles have a mean diameter in the order of a hundred angströms and a molecular weight in the order of $10^6$ to $10^7$, said ferrofluids having an absorption spectrum in the visible light with a shoulder in the range of about 450 to 500 nm and an X-ray powder diagram identical to that of bivalent metal ferrites.

* * * * *